United States Patent [19]

Gotfried et al.

[11] Patent Number: 5,765,166
[45] Date of Patent: Jun. 9, 1998

[54] USE OF SYMMETRIC MULTIPROCESSORS FOR MULTIPLE HYPOTHESIS TRACKING

[75] Inventors: Roberta L. Gotfried, Palos Verdes; Douglas C. Kubler, Thousand Oaks; G. David Ledford, Torrance; Joseph S. Zahavi, Redondo Beach; Stephen C. Oxford, Los Angeles, all of Calif.

[73] Assignee: Raytheon Company, Lexington, Mass.

[21] Appl. No.: 636,435

[22] Filed: Apr. 23, 1996

[51] Int. Cl.⁶ ........................................................ G06F 17/30
[52] U.S. Cl. ............................................. 707/104; 342/190
[58] Field of Search .................................. 707/104, 205; 711/153, 173; 395/800.16–800.22, 200.45, 200.78, 800.1, 800.13; 342/190, 175, 90, 95, 96

[56] References Cited

U.S. PATENT DOCUMENTS

| | | | |
|---|---|---|---|
| 5,138,321 | 8/1992 | Hammer | 342/36 |
| 5,202,691 | 4/1993 | Hicks | 342/90 |
| 5,315,701 | 5/1994 | Dinicola et al. | 345/502 |
| 5,325,098 | 6/1994 | Blair et al. | 342/95 |
| 5,357,632 | 10/1994 | Pian et al. | 395/675 |
| 5,379,044 | 1/1995 | Carlson et al. | 342/90 |
| 5,384,890 | 1/1995 | Anderson et al. | 704/200 |
| 5,425,136 | 6/1995 | Lo et al. | 345/427 |
| 5,664,214 | 9/1997 | Taylor et al. | 395/800.2 |

Primary Examiner—Thomas G. Black
Assistant Examiner—M. N. Von Buhr
Attorney, Agent, or Firm—Leonard A. Alkov; Glenn H. Lenzen, Jr.

[57] ABSTRACT

A parallel processing approach for use in multiple hypothesis tracking applications that provides partitioning and load balancing to achieve greater processing efficiency. The present invention comprises a plurality of processors that are each coupled to a shared memory, and which communicate to a central database stored in the shared memory. The central database is organized as a collection of radar tracks. Radar data is supplied to the processors as an input data stream organized in terms of radar tracks. The parallel processors are configured so that the next available processor retrieves the next successive measurement data point from the input data stream, updates tracks in the database using each retrieved measurement data point, wherein all processors operate independently without external synchronization, partitions the database into noninteracting clusters, wherein partitioning is executed in parallel by the plurality of processors which operate independently without external synchronization, retrieves the next successive cluster, forms and selects hypotheses based on the retrieved cluster, and updates the database based on the selected hypotheses. The present invention achieves an efficient implementation of multiple hypothesis tracking to provide for real-time multiprocessing. Parallelization of noninteractive and interactive multiple hypothesis tracking functions is readily achieved using the present invention. A parallel processing method for use in multiple hypothesis tracking applications is also disclosed.

5 Claims, 2 Drawing Sheets

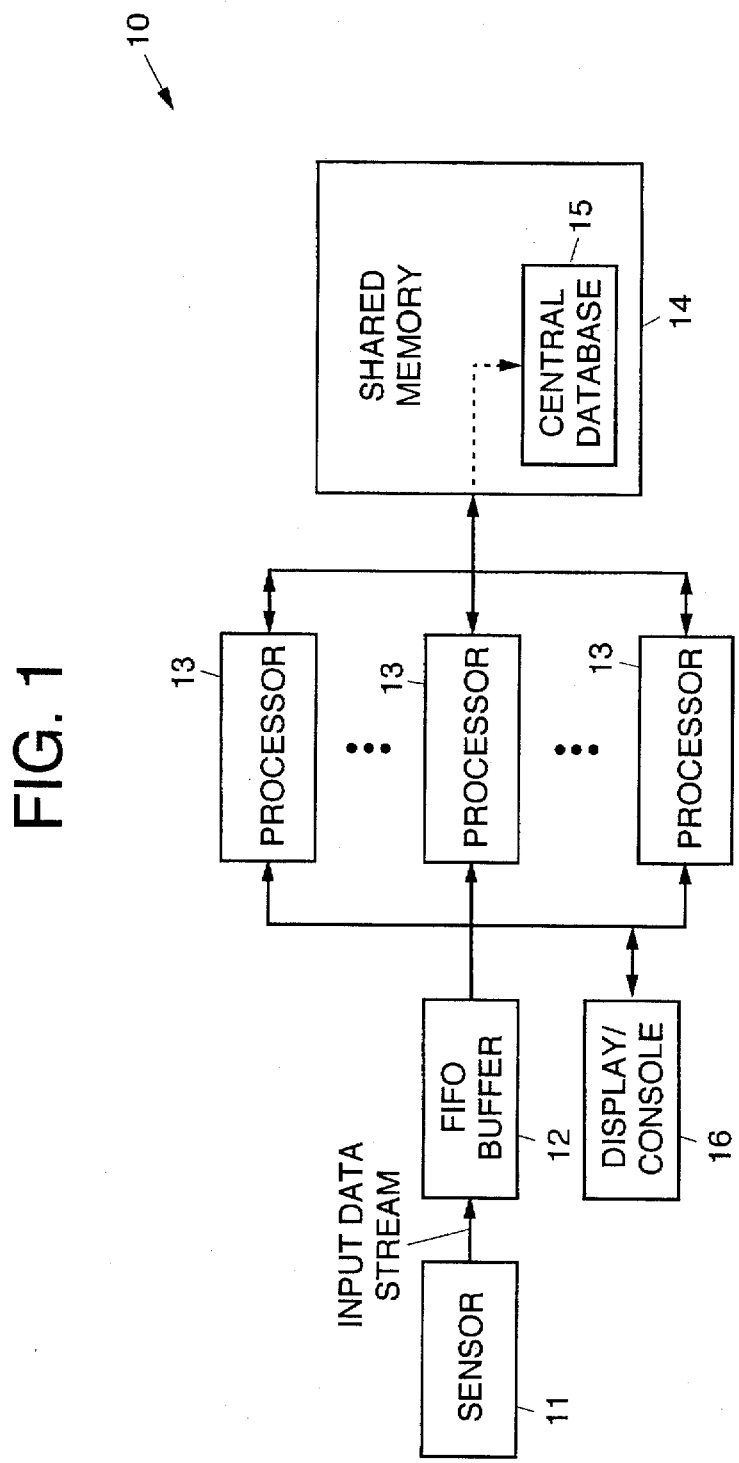

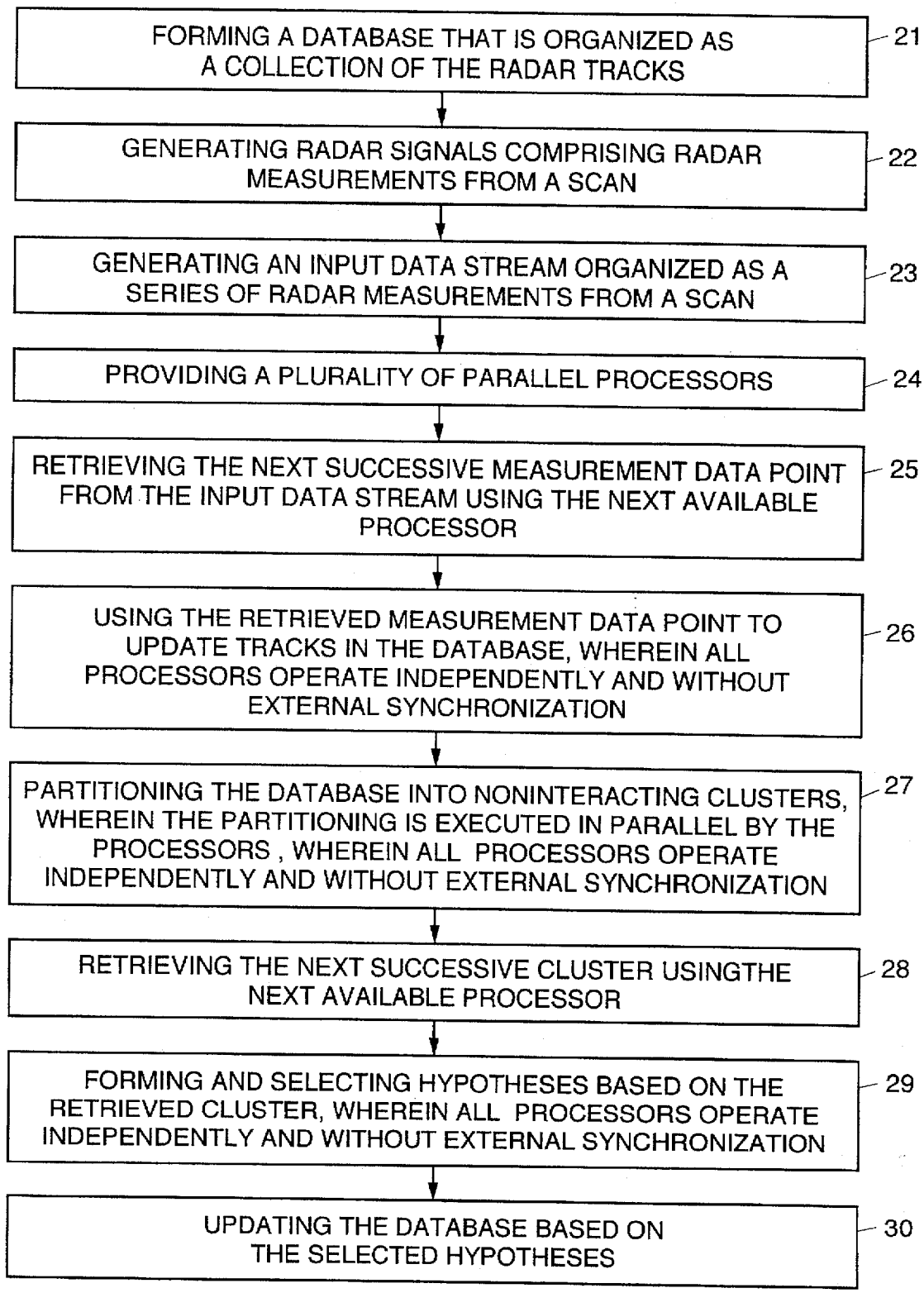

USE OF SYMMETRIC MULTIPROCESSORS FOR MULTIPLE HYPOTHESIS TRACKING

BACKGROUND

The present invention relates generally to parallel processing systems and methods, and more particularly, to a parallel processing system and method for use in multiple hypothesis tracking applications.

There are two basic approaches to parallel processing for use in multiple hypothesis tracking applications in use today. The first approach is to partition tracking space into segments (by range or azimuth), utilize separate multiple hypothesis tracking processors to process data in each segment, and combine the output. Disadvantages of this approach include additional overhead resulting from segmentation at the front end of the processing chain, and merging outputs at the completion of multiple hypothesis tracking processing. The requirement to merge outputs of the respective processors has additional disadvantages due to difficulties in resolving boundary regions.

Furthermore, load balancing is difficult to achieve in the first approach due to the dynamic nature of the operational environment, where observations tend to cluster within a small geographical region. This first approach is also not scaleable because an increase in the number of processors dramatically increases the latency and number of boundary areas that must be resolved.

The second approach is to partition functions among multiple processors. The disadvantages of this approach include synchronization complexity and data transfer resource demands. Furthermore, this approach is not scaleable or fault tolerant.

Accordingly, it is an objective of the present invention to provide for an improved parallel processing system and method for use in multiple hypothesis tracking applications.

SUMMARY OF THE INVENTION

To meet the above and other objectives, the present invention provides for a new approach to parallel processing for use in multiple hypothesis tracking applications that achieves partitioning in a novel way and load balancing for greater efficiency. The basis of the approach is a first-in, first-out (FIFO) algorithm for distributing incoming observations across multiple available central processing units (CPUs), or processors that have shared memory. The present invention achieves an efficient implementation of multiple hypothesis tracking that provides for real-time multiprocessing.

The present invention comprises a plurality of processors that are each coupled to a shared memory, and which communicate to a central database stored in shared memory. The central database is organized as a collection of radar measurements. Each of the processors receives radar data derived from a radar receiver. The radar data is supplied to the processors as an input data stream organized in terms of radar tracks and is supplied by way of a first-in, first-out (FIFO) buffer. The parallel processors respectively retrieve the next successive measurement data point from the input data stream, process the retrieved measurement data point using a multiple hypothesis tracking processing algorithm, update an entry in the database when required, and retrieve the next measurement data point until no more measurement data points are available.

The present invention provides the following benefits, and achieves load balancing in a multiprocessor environment. The present parallel processing approach provides for efficient use of memory and processing resources. The present invention is fault tolerance, scaleable, has reduced implementation complexity, and is applicable in multiple application domains. For example, applications for the present invention include surveillance systems, such as radar and infrared surveillance systems, and the like.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a block diagram illustrative of a parallel processing system for use in multiple hypothesis tracking applications in accordance with the principles of the present invention; and FIG. 2 illustrates a flow diagram of a processing method or algorithm in accordance with the principles of the present invention.

DETAILED DESCRIPTION

Referring to the drawing figures, FIG. 1 is a block diagram illustrative of a parallel processing system 10 for use in multiple hypothesis tracking applications in accordance with the principles of the present invention. Multiple hypothesis tracking is a tracking technique wherein multiple measurements may be associated with each track, multiple tracks may be associated with a single measurement, and resulting association ambiguities are resolved by a process of hypothesis formation and selection.

The system 10 comprises a plurality of central processing units (CPUs) 13, or processors 13, that are each coupled to a shared memory 14, and which communicate to a central database 15 stored in the shared memory 14. The central database 15 is organized as a collection of radar tracks. Each of the processors 13 is coupled to receive radar data derived from a radar receiver 11 or sensor 11. The radar data is supplied to the processors 13 as an input data stream organized in terms of radar tracks and is supplied by way of a first-in, first-out (FIFO) buffer 12. A display or console 16 is coupled to each of the processors 13 for displaying the radar data.

The present approach to multiple hypothesis tracking in a multiprocessor environment achieves efficient resource utilization of both processors 13 and shared memory 14, resulting in minimization of processor latency and load balancing. Each processor 13 schedules its own processing without intervention from a central executive. The key to the present processing approach is the input data stream that is used to supply data to the processors 13.

Each processor 13 removes from the input stream the next successive tracking data point. Each processor 13 updates one or more entries in the then performs complete multiple hypothesis tracking processing on that tracking data point and automatically updates an entry in the central database 15 when required. Maximum throughput is assured without formal scheduling, as soon as a processor 13 has finished processing of a tracking data point, it retrieves the next tracking data point from the FIFO buffer 12. Therefore, a processor 13 cannot be idle unless there is no data to process.

The central database 15 is organized as a collection of tracks. Therefore, any update of the central database 15 is localized to one track at a time and any lock out of other processors 13 is limited to that one track. The chances of delays due to update of shared data is thus minimized.

When a batch of input data has been exhausted by the processing described in the preceding paragraphs, a second stage of processing begins. Each processor 13 retrieves a track from the database 15. The processor 13 finds and tags all tracks that interact with the retrieved track. Two tracks are said to interact if they have been updated by at least one measurement in common during the last n scans, where n is selectable by an operator.

More generally, the processor 13 finds and tags all tracks that interact with the retrieved track through an intermediary path. Two tracks, A and Z, are said to interact through an intermediary path if there is a track B that interacts with A, a track C that interacts with B, a track D . . . (continuing in a like manner), and a track Y that interacts with Z. Through this procedure, the processor 13 tags a collection of tracks that interact directly or indirectly with the retrieved track. The process of retrieving a track and tagging a collection of interacting tracks constitutes a clustering function. The tagged collection of tracks is called a cluster.

Each processor 13 independently retrieves a track and tags interacting tracks (thus forming a cluster) until all tracks in the database 15 are tagged as belonging to a cluster. The clusters create a partition in the database 15 consisting of noninteracting sets.

At this point, each processor 13 retrieves a cluster and performs standard multiple hypothesis tracking hypotheses formation and selection processing on tracks in the cluster. Hypothesis formation and selection is a standard track bookkeeping procedure, wherein ambiguous tracks in the database are deleted. Because clusters do not interact, each processor 13 forms and selects hypotheses independent and unsynchronized with the hypothesis processing of all other processors 13. When en the processor 13 has completed hypothesis formation and selection on a retrieved cluster, it retrieves another cluster until all clusters are exhausted. In this way, no processor 13 is idle until all tracks have undergone hypothesis formation and selection processing.

The clustering function employed in a reduced to practice embodiment of the present invention was implemented in the Ada programming language for demonstration purposes. This embodiment was tested on four scenarios of actual tracking data. The results were analyzed to estimate the degree of load balancing. The clustering function and parallel processing system 10 and method 20 of the present invention provided for more efficient processing than conventional processing techniques due to its improved load balancing approach.

For the purposes of completeness, FIG. 2 illustrates a flow diagram of a parallel processing method 20 or algorithm 20 in accordance with the principles of the present invention that may be used in multiple hypothesis tracking applications. The parallel processing method 20 comprises the following steps.

A database 15 is formed 21 that is organized as a collection of the radar tracks that correspond to target tracks derived from the radar signals. Radar signals are generated 22 that comprise radar measurements derived from a scan. An input data stream is generated 23 that is organized as a series of radar measurements from a scan. A plurality of parallel processors 13 are provided 24. Each successive measurement data point is retrieved 25 from the input data stream by the next available processor 13. Each retrieved measurement data point is used to update 26 tracks in the database 15, wherein all processors 13 operate independently without external synchronization. The database 15 is partitioned 27 into noninteracting clusters, wherein partitioning 27 is executed in parallel by the plurality of processors 13 which operate independently without external synchronization. The next successive cluster is retrieved 28 by the next available processor 13. Hypotheses are formed and selected 29 based on the retrieved cluster, wherein all processors 13 operate independently without external synchronization. The database 15 is updated 30 based on the selected hypotheses.

Thus, an improved parallel processing system and method for use in multiple hypothesis tracking applications have been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. A parallel processing system for use in multiple hypothesis tracking applications, said system comprising:
    radar means for producing an input data stream organized as a series of radar tracks;
    a central database stored in a shared memory that is organized as a collection of the radar tracks; and
    a plurality of processors that are each coupled to the shared memory and the central database, and to the radar means, and wherein the processors are configured such that the next available processor retrieves the next successive measurement data point from the input data stream, updates tracks in the database using each retrieved measurement data point, wherein all processors operate independently without external synchronization, partitions the database into noninteracting clusters, wherein partitioning is executed in parallel by the plurality of processors which operate independently without external synchronization, retrieves the next successive cluster, forms and selects hypotheses based on the retrieved cluster, and updates the database based on the selected hypotheses.

2. The system of claim 1 wherein the radar means comprises:
    a sensor for producing radar signals; and
    a first-in, first-out buffer coupled to the sensor for producing the input data stream.

3. The system of claim 1 further comprising a display is coupled to each of the processors for displaying the radar data.

4. The system of claim 1 wherein all processors operate independently without external synchronization.

5. A parallel processing method for use in multiple hypothesis tracking applications, said method comprising the steps of:
    forming a database that is organized as a collection of the radar tracks;
    generating radar signals that comprise radar measurements derived from a scan;
    generating an input data stream that is organized as a series of radar measurements from a scan;
    providing a plurality of parallel processors;
    retrieving each successive measurement data point from the input data stream using the next available processor;
    updating tracks in the database using each retrieved measurement data point, wherein all processors operate independently without external synchronization;

partitioning the database into noninteracting clusters, wherein partitioning is executed in parallel by the plurality of processors which operate independently without external synchronization;

retrieving the next successive cluster using the next available processor;

forming and selecting hypotheses based on the retrieved cluster, wherein all processors operate independently without external synchronization; and updating the database based on the selected hypotheses.

* * * * *